(12) United States Patent
Rysdyk et al.

(10) Patent No.: US 11,738,866 B1
(45) Date of Patent: Aug. 29, 2023

(54) POWER MANAGEMENT FOR LANDING UNMANNED AERIAL VEHICLES WITH VERTICAL-LIFT ROTORS

(71) Applicant: The Boeing Company, Chicago, IL (US)

(72) Inventors: Rolf Rysdyk, White Salmon, WA (US); Jonathon G. Winde, Chicago, IL (US)

(73) Assignee: The Boeing Company, Arlington, VA (US)

(*) Notice: Subject to any disclaimer, the term of this patent is extended or adjusted under 35 U.S.C. 154(b) by 0 days.

(21) Appl. No.: 17/713,518

(22) Filed: Apr. 5, 2022

(51) Int. Cl.
  B64C 39/02 (2023.01)
  G05D 1/04 (2006.01)
  B64U 30/20 (2023.01)

(52) U.S. Cl.
  CPC ........... B64C 39/024 (2013.01); G05D 1/042 (2013.01); *B64U 30/20* (2023.01)

(58) Field of Classification Search
  CPC ....... B64C 39/024; G05D 1/042; B64U 30/20
  See application file for complete search history.

(56) References Cited

U.S. PATENT DOCUMENTS

| | | | |
|---|---|---|---|
| 9,359,067 B2 | 6/2016 | Fucke et al. | |
| 9,932,111 B2* | 4/2018 | Spinelli | G08G 5/0091 |
| 10,984,664 B2* | 4/2021 | Spinelli | G05D 1/0688 |
| 11,307,571 B2* | 4/2022 | Lai | B64C 39/024 |
| 11,577,848 B1* | 2/2023 | Poland | G07C 5/0808 |

* cited by examiner

*Primary Examiner* — Richard M Camby
(74) *Attorney, Agent, or Firm* — McDonnell Boehnen Hulbert & Berghoff LLP (57) ABSTRACT

In an example, an unmanned aerial vehicle (UAV) is disclosed, which includes an avionics system, a propulsion system, vertical-lift rotors, and a controller. The controller performs operations including, in response to detecting loss of operation of the propulsion system, determining energy and time constraints based on (i) a remaining avionics battery life and (ii) a remaining rotor battery life. The operations also include using a rotor edgewise inflow model stored on the controller, evaluate parameters for a glide descent trajectory and subsequent rotor-powered flight trajectory to a candidate landing site, to determine whether, based on evaluation of the parameters, an estimated energy consumption during the rotor-powered flight trajectory and time needed for the UAV to land at the candidate landing site exceed the constraints. The operations also include in response to determining that the estimated energy consumption and time needed exceed the energy and time constraints, selecting an alternative candidate landing site.

20 Claims, 5 Drawing Sheets

POWER MANAGEMENT FOR LANDING UNMANNED AERIAL VEHICLES WITH VERTICAL-LIFT ROTORS

FIELD

The present disclosure relates generally to unmanned aerial vehicles (UAVs), and more particularly, to power management for landing UAVs with vertical-lift rotors.

BACKGROUND

A UAV can be equipped with vertical-lift rotors, which the UAV can use for taking off, hovering, and landing vertically. This can be referred to as a vertical take-off and landing (VTOL) capability for a UAV. Such UAVs are typically controlled autonomously or with a degree of remote operator guidance. In some situations, a UAV can lose functionality during flight, such as a loss of power to the UAV's engine. A safe landing is desired in these situations, and existing solutions typically involve computing various trajectories to potential emergency landing sites.

What is needed is an improved control system for a VTOL-capable UAV that takes into account various factors in facilitating safe navigation of the UAV to a desired landing site, while also utilizing both glide capabilities and VTOL capabilities of the UAV.

SUMMARY

In an example, an unmanned aerial vehicle (UAV) is described. The UAV includes an avionics system, a propulsion system, vertical-lift rotors, and a controller comprising one or more processors configured to execute instructions stored in memory to perform operations. The operations include in response to detecting loss of operation of the propulsion system, determining energy and time constraints based on (i) a remaining avionics battery life of the avionics system and (ii) a remaining rotor battery life of the vertical-lift rotors. The operations also include using a rotor edgewise inflow model stored on the controller, evaluate parameters for a glide descent trajectory and subsequent rotor-powered flight trajectory to a candidate landing site, to determine whether, based on evaluation of the parameters, an estimated energy consumption during the rotor-powered flight trajectory and time needed for the UAV to land at the candidate landing site exceed the energy and time constraints. The operations also include in response to determining that the estimated energy consumption and time needed for the UAV to land at the candidate landing site exceed the energy and time constraints, selecting an alternative candidate landing site.

In another example, a system for controlling one or more unmanned aerial vehicles (UAVs) is described. The system includes the one or more UAVs, each including an avionics system, a propulsion system, vertical-lift rotors, and a controller comprising one or more processors configured to execute instructions stored in memory to perform operations. The operations include in response to detecting loss of operation of the propulsion system, determining energy and time constraints based on (i) a remaining avionics battery life of the avionics system and (ii) a remaining rotor battery life of the vertical-lift rotors. The operations also include using a rotor edgewise inflow model stored on the controller, evaluate parameters for a glide descent trajectory and subsequent rotor-powered flight trajectory to a candidate landing site, to determine whether, based on evaluation of the parameters, an estimated energy consumption during the rotor-powered flight trajectory and time needed for the UAV to land at the candidate landing site exceed the energy and time constraints. The operations also include in response to determining that the estimated energy consumption and time needed for the UAV to land at the candidate landing site exceed the energy and time constraints, selecting an alternative candidate landing site. The system also includes a communications network configured to communicate, to the one or more UAVs, a set of predetermined landing sites comprising the candidate landing site and the alternative candidate landing site.

In another example, a method for controlling an unmanned aerial vehicle (UAV) is described. The method includes in response to detecting loss of operation of a propulsion system of the UAV, determining energy and time constraints based on (i) a remaining avionics battery life of an avionics system of the UAV and (ii) a remaining rotor battery life of vertical-lift rotors of the UAV. The method also includes using a rotor edgewise inflow model, evaluate parameters for a glide descent trajectory and subsequent rotor-powered flight trajectory to a candidate landing site, to determine whether, based on evaluation of the parameters, an estimated energy consumption during the rotor-powered flight trajectory and time needed for the UAV to land at the candidate landing site exceed the energy and time constraints. The method also includes in response to determining that the estimated energy consumption and time needed for the UAV to land at the candidate landing site exceed the energy and time constraints, selecting an alternative candidate landing site.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Unless otherwise specifically noted, elements depicted in the drawings are not necessarily drawn to scale.

Within examples, described herein is a UAV, system, and a corresponding method for controlling the UAV, particularly to manage the power consumption of a vertical-lift-equipped UAV and assist the UAV with landing in the event of a loss of operation of a propulsion system of the UAV.

The disclosed UAV, for example, includes an avionics system, a propulsion system, vertical-lift rotors, and a controller. In the event the controller detects a loss of operation of the propulsion system (e.g., engine failure), the controller responsively determines energy and time constraints based on (i) a remaining avionics battery life of the avionics system and (ii) a remaining rotor battery life of the vertical-lift rotors. The controller then uses a rotor edgewise inflow model stored on the controller to evaluate parameters (e.g., a path of the UAV, as well as speed profile of the UAV's speed over time) for a glide descent trajectory and subsequent rotor-powered flight trajectory to a candidate landing site, to thereby determine whether, based on evaluation of the parameters, an estimated energy consumption during the rotor-powered flight trajectory and time needed for the UAV to land at the candidate landing site exceed the energy and time constraints. And in response to determining that the estimated energy consumption and time needed for the UAV to land at the candidate landing site exceed the energy and time constraints, the controller selects an alternative candidate landing site. The controller then evaluates parameters for the alternative candidate landing site to determine whether the alternative candidate landing site is suitable for landing.

Within examples, the UAV receives the candidate landing sites from a ground control computing system. The ground control computing system can be configured to perform the same operations as the controller of the UAV, so that the ground control computing system can assist other UAVs with finding suitable landing sites in the event of engine failure, such as vertical-lift rotor-equipped UAVs that do not have the same landing site evaluation capabilities as the disclosed UAV.

Accordingly, a controller onboard a UAV and/or a controller of a ground control computing system is able to evaluate multiple candidate landing sites and determine a desired flight trajectory for safely landing at a given one of those landing sites, particularly in a manner that meets the energy and time constraints placed on the avionics and rotor systems of the UAV.

These and other improvements are described in more detail below. Implementations described below are for purposes of example. The implementations described below, as well as other implementations, may provide other improvements as well.

Figure 1:
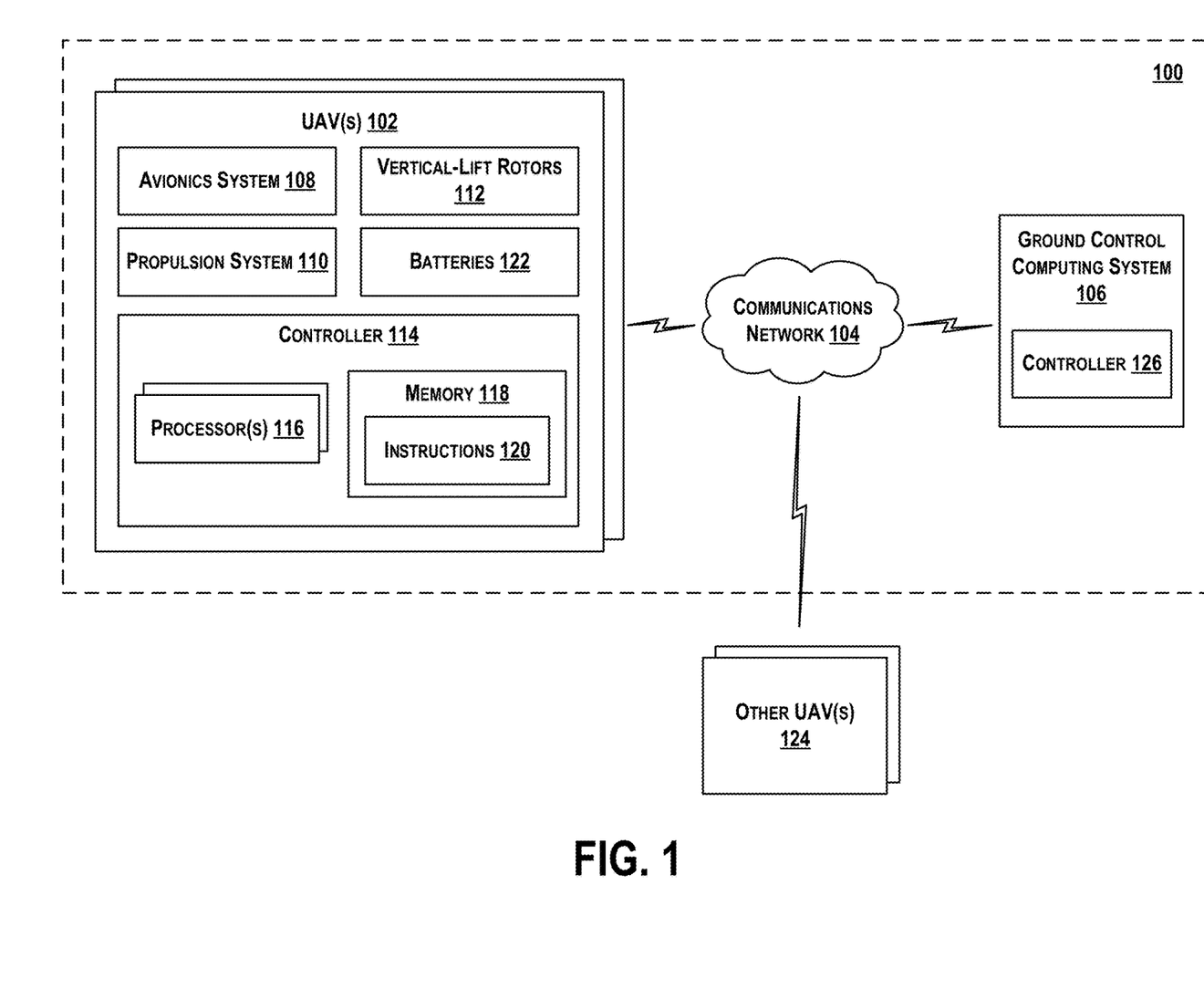
FIG. 1 depicts a system, according to an example implementation.

Referring now to the figures, FIG. 1 depicts a system 100 for controlling one or more UAVs. The system 100 includes the one or more UAVs, of which UAV 102 is representative. The system 100 also includes a communications network 104 that is configured to communicate various information to the one or more UAVs. And the system 100 also includes a ground control computing system 106 that is configured to engage in communication with each of the one or more UAVs via the communications network 104.

Each UAV, as represented by UAV 102, includes an avionics system 108, a propulsion system 110 (e.g., a main engine), vertical-lift rotors 112 (e.g., propeller blades), and a controller 114. The controller 114 includes one or more processors 116, as well as memory 118 storing instructions 120. The UAV 102 also includes batteries 122 configured to power the avionics system 108, the propulsion system 110, the vertical-lift rotors 112, and the controller 114. Although not explicitly shown, the UAV 102 can include other components as well, such as flaps or other drag devices, or wings, which can include such flaps or other drag devices. Within examples, the UAV 102 and/or at least one other UAV of the one or more UAVs is a fixed-wing UAV.

Within examples, the propulsion system 110 can take the form of an internal combustion engine or a hybrid engine such as an electric-internal combustion engine. Using the vertical-lift rotors 112, the UAV 102 is capable of taking off, hovering, and landing vertically.

The one or more processors 116 can be a general-purpose processor or special purpose processor (e.g., a digital signal processor, application specific integrated circuit, etc.). The one or more processors 116 are configured to execute the instructions 120 (e.g., computer-readable program instructions including computer executable code) that are stored in the memory 118 and are executable to provide various operations described herein. At least some of the operations described herein as being performed by the controller 114 can be performed by the one or more processors 116.

The memory 118 can take the form of one or more computer-readable storage media that can be read or accessed by the one or more processors 116. The computer-readable storage media can include volatile and/or non-volatile storage components, such as optical, magnetic, organic or other memory or disc storage, which can be integrated in whole or in part with the one or more processors 116. The memory 118 is considered non-transitory computer readable media. In some examples, the memory 118 can be implemented using a single physical device (e.g., one optical, magnetic, organic or other memory or disc storage unit), while in other examples, the memory 118 can be implemented using two or more physical devices.

The controller 114 can take the form of a computing device configured to manage and control operations of at least a portion of the other components of the UAV 102, including but not limited to the avionics system 108, the propulsion system 110, and the vertical-lift rotors 112. The controller 114 is also coupled to the batteries 122 and configured to monitor a battery life (e.g., energy level) of each such battery.

Within examples, such as the example shown and described with respect to FIG. 1, and as primarily discussed herein, the controller 114 is located onboard the UAV 102. Within other examples, however, at least a portion the operations described herein are performed by a separate controller of the ground control computing system 106 that is in communication with the controller 114 of the UAV 102.

Within examples, the avionics system 108 and the vertical-lift rotors 112 are powered by respective different batteries. As such, the batteries 122 can include a first battery configured to power the avionics system 108 and a second, different battery configured to power the vertical-lift rotors 112. Within other examples, the avionics system 108 and the vertical-lift rotors 112 are powered by the same battery.

As further shown, the ground control computing system 106 is also configured to engage in communication with at least one other UAV 124, different from the one or more UAVs, via the communications network 104. A representative UAV of the at least one other UAV 124 can take the form of a UAV that does not include a respective controller configured to perform the disclosed operations. As such, the ground control computing system 106 can be configured to perform the disclosed operations on behalf of the at least one other UAV 124 and send that/those UAV(s) instructions for landing. To facilitate this, the ground control computing system 106 can include a controller 126 configured to perform the disclosed operations.

The disclosed operations will now be described in more detail. In operation, there may be a situation in which the controller 114 detects a loss of operation of the propulsion system 110, such as due to a power outage of the propulsion system 110. With this loss of operation, the UAV 102 must rely on the avionics system 108 and the vertical-lift rotors 112 to navigate to a landing site. As such, it is desired to land the UAV 102 safely, at a landing site that is not within no-landing zone, and in a manner that does not exceed any time or energy constraints defined by the remaining battery life of the one or more of the batteries 122 that power the avionics system 108 and the vertical-lift rotors 112.

Thus, in response to detecting loss of operation of the propulsion system 110, and in order to help manage both avionics power and VTOL power, the controller 114 determines energy and time constraints based on (i) a remaining avionics battery life of the avionics system 108 and (ii) a remaining rotor battery life of the vertical-lift rotors 112. In other words, these constraints represent a remaining amount of avionics battery life and rotor battery life for the controller 114 to set aside for the UAV 102 to safely land.

Figure 2:
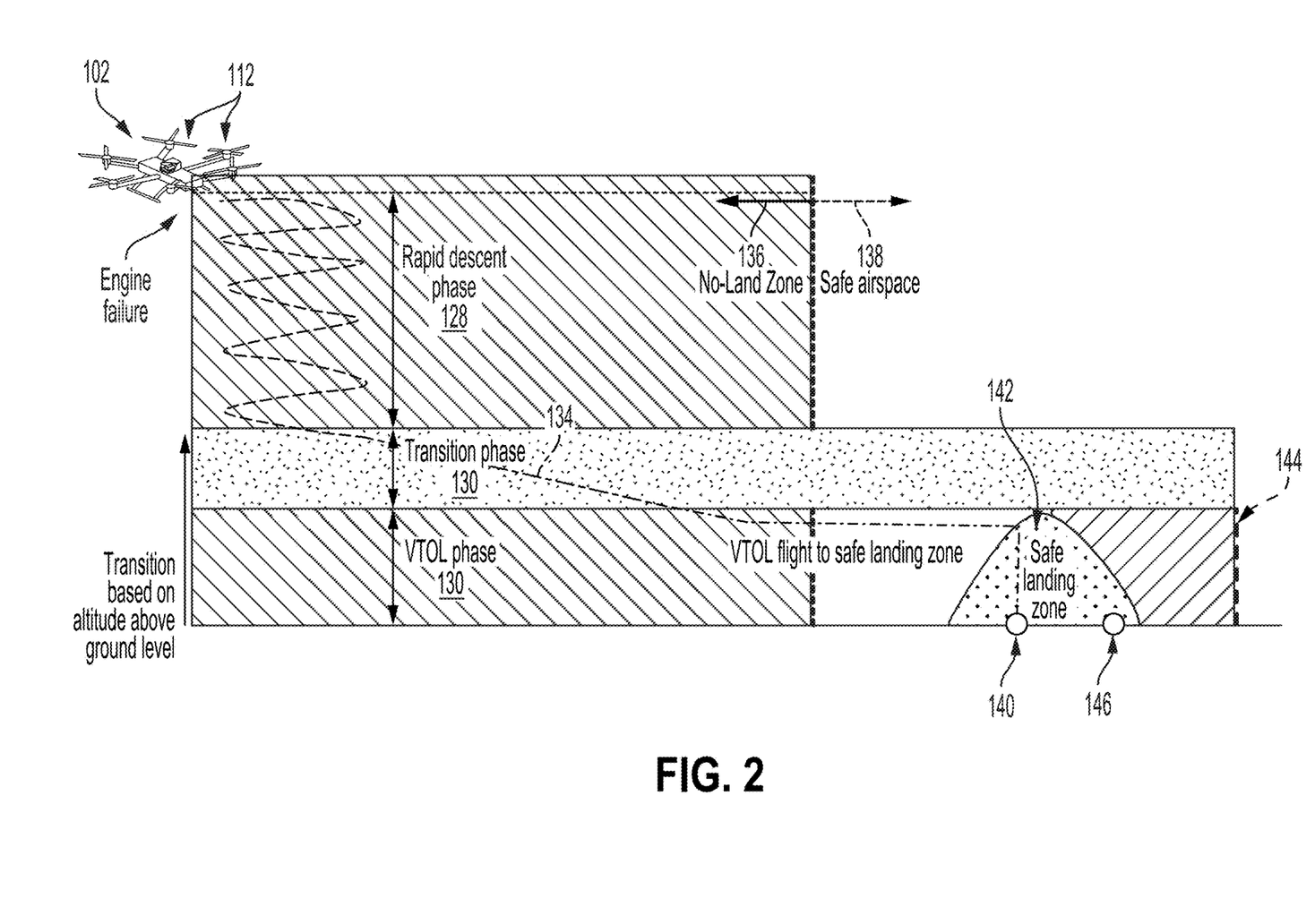
FIG. 2 depicts three phases of a UAV's decent trajectory to a landing site, according to an example implementation.
Figure 3:
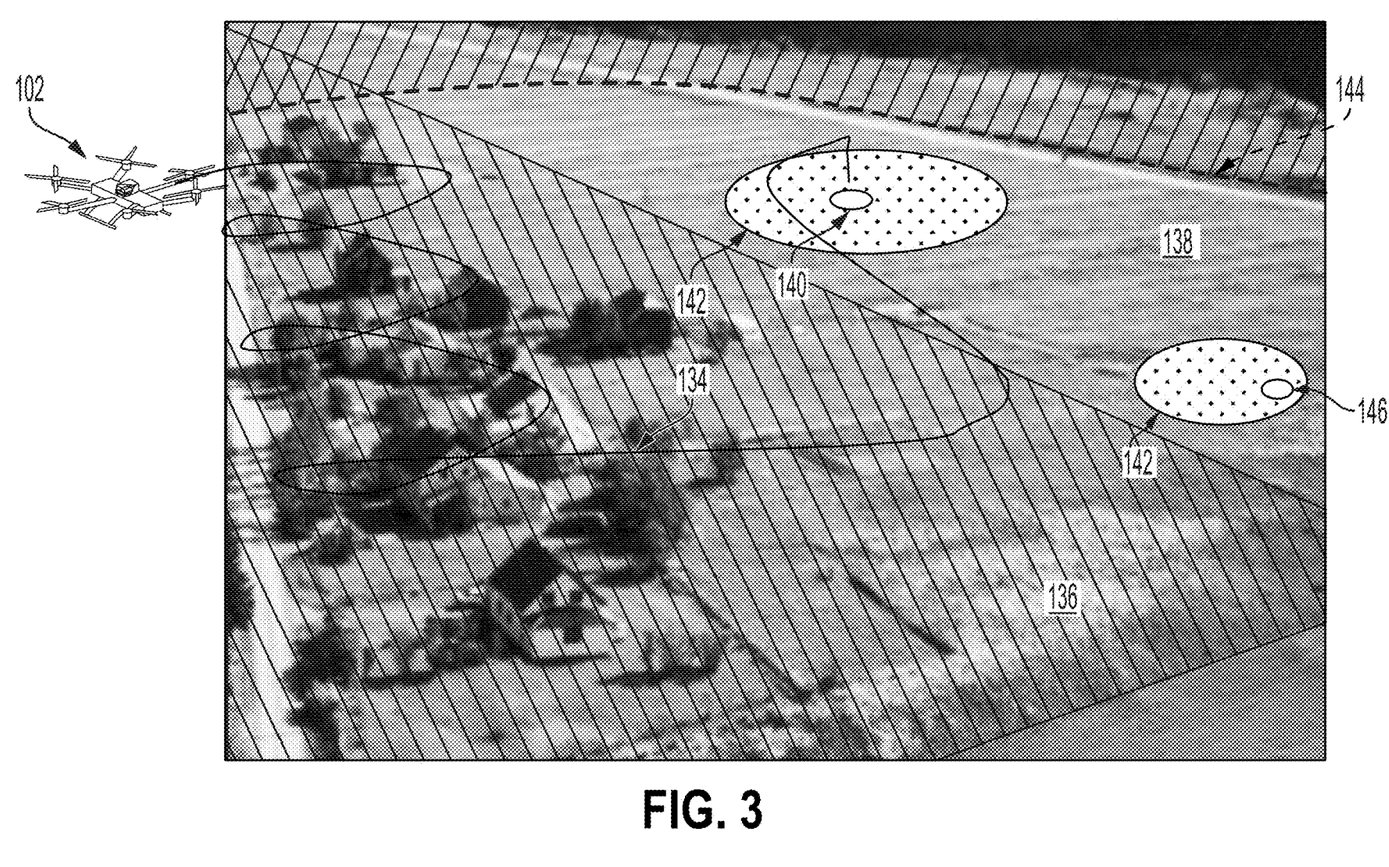
FIG. 3 depicts a three-dimensional view of a UAV's flight trajectory to a landing site, according to an example implementation.

When the propulsion system 110 loses power, the descent of the UAV 102 is defined by three phases. FIG. 2 depicts these three phases—a rapid descent phase 128, a transition phase 130, and a VTOL phase 132—as well as a trajectory 134 of the UAV 102, according to an example implementation. FIG. 3 then depicts the trajectory 134 in a three-dimensional view, according to an example implementation. Within examples, the avionics system 108 is used during all three phases, and thus power is drawn during these phases. Whereas, the vertical-lift rotors 112 are used only during the VTOL phase 132. Within other examples, the avionics system 108 can be used for less time. In either case, the corresponding batteries for these subsystems have respective energy and time constraints to take into account.

The first phase is referred to herein as the rapid descent phase 128, in which the UAV 102 relies on gliding to descent to a particular altitude and/or speed. And UAV 102 might fly at minimum airspeed.

Once a desired altitude and/or speed is reached, plus or minus a predefined margin, the controller 114 instructs the UAV 102 to pull up its nose and slow down, and then, once another desired altitude and/or speed is reached, the controller 114 activates the vertical-lift rotors 112 and the UAV 102 quickly decelerates. The time during which this occurs is referred to herein as the transition phase 130 and, for the sake of example, the end of the transition phase 130 can be defined as a time-point at which the vertical-lift rotors 112 are turned on, thus beginning the VTOL phase 132.

Subsequent rotor-powered flight then occurs, which is referred to herein as the VTOL phase 132. During the VTOL phase 132, the UAV 102 uses the vertical-lift rotors 112 to navigate the trajectory 134 and then land. In addition, landing in the no-land zone 136 is not desired. Rather, the disclosed operations aim to control the UAV 102 to travel into safe airspace 138 and land at a desired landing site 140 within a safe landing zone (e.g., within safe landing region 142).

Also shown in FIG. 2 are one or more safe landing regions 142 and a maximum range 144. The safe landing region 142 is a region within which the UAV 102 can also safely land within the energy and time constraints, based on the evaluation performed by the controller 114, as described in more detail below. The maximum range 144 is a maximum range from a current location of the UAV 102 within which the UAV 102 is capable of landing at a landing site. The controller 114 determines the maximum range 144 based at least in part on of the remaining avionics battery life and the remaining rotor battery life of the vertical-lift rotors needed to reach the desired landing site 140 with a sufficient amount of rotor battery life set aside for the UAV 102 to vertically descend and safely land upon reaching the desired landing site 140. Since conditions and the location of the UAV 102 change while the UAV 102 is in flight, the controller 114 can be configured to periodically reevaluate the parameters described herein and recalculate the maximum range 144 as needed.

Further, as will be discussed later herein, the controller 114 is configured to evaluate multiple different candidate landing sites to assess their viability for safe landing. For example, the controller 114 could determine that the desired landing site 140 is not viable, in which case the controller 114 select another candidate landing site to evaluate, such as landing site 146 shown in FIGS. 2 and 3.

As an example of the time (and corresponding energy) constraints the controller 114 determines, consider a situation in which, at the time the propulsion system 110 loses power, the controller 114 determines that the remaining avionics battery life is 25 minutes and that the remaining rotor battery life is 6 minutes. Thus, the UAV 102 must be safely landed at a particular landing site within 25 min, while also allowing for a maximum of 6 minutes of rotor-powered flight. In other words, the energy and time constraints are determined based at least in part on a lesser of the remaining avionics battery life and the remaining rotor battery life. Other examples are possible as well.

Within examples, the energy and time constraints allow for use of an entirety of the remaining rotor battery life and/or the remaining avionics battery life. Within other examples, the energy and time constraints allow for use of a portion of the remaining rotor battery life and/or the remaining avionics battery life. For instance, the controller 114 can be configured such that, in evaluating how best to land the UAV 102 as described in more detail below, the controller 114 will not allow consumption of the remaining rotor battery life and/or the remaining avionics battery life to fall below a predetermined energy threshold, such as 10% capacity, or to exceed a predetermined time threshold, such as 90% of the total time remaining. As an example of the latter, even if the remaining rotor battery life is determined to be 10 minutes, the controller 114 can be configured to land the UAV 102 in a manner that requires the vertical-lift rotors 112 to be turned on for no more than 9 minutes.

Further, in some situations, the avionics system 108 has a constant power draw during flight after the power loss, whereas VTOL power draw by the vertical-lift rotors 112 is a function of airspeed, with the highest VTOL power draw occurring at approximately zero airspeed when the UAV 102 is hovering.

Referring back to the disclosed operations, the controller 114, using a rotor edgewise inflow model stored on the controller 114 (e.g., in memory 118), evaluates parameters for a glide descent trajectory and subsequent rotor-powered flight trajectory to a candidate landing site (e.g., landing site 140). The controller 114 performs this evaluation to determine whether, based on evaluation of the parameters, an estimated energy consumption during the rotor-powered flight trajectory and time needed for the UAV 102 to land at the candidate landing site exceed the energy and time constraints.

Herein, and in line with the three phases of descent described above, the glide descent trajectory refers to UAV operation using the avionics system 108, but without using the propulsion system 110 and the vertical-lift rotors 112. In addition, the rotor-powered flight trajectory refers to UAV operation using the vertical-lift rotors 112 and the avionics system 108, but without using the propulsion system 110.

To facilitate evaluation of a candidate landing site, the controller 114 stores, or otherwise has access to, a set of predetermined landing sites. The set of predetermined landing sites includes the candidate landing site and can also include alternative candidate landing sites as well. Within examples, the set of predetermined landing sites are identified by an off-board system, located remote from the one or more UAVs, and either pre-loaded into memory of the one or more UAVs (e.g., memory 118 of UAV 102) before takeoff or later communicated by the communications network 104 to the one or more UAVs. In the later example, the communications network 104 is configured to communicate the set of predetermined landing sites to the one or more UAVs. More particularly, the ground control computing system 106 is configured to transmit the set of predetermined landing sites to the one or more UAVs via the communications network 104.

Within examples, the set of predetermined landing sites are a set of predetermined landing sites that are within the maximum range 144 of the UAV 102. The controller 114 or the ground control computing system 106 thus selects, from that set of predetermined landing sites, a particular predetermined landing site as the candidate landing site for evaluation.

Within examples, for a given candidate landing site, the evaluation of the parameters involves determining whether, based on a first set of parameters for the glide descent trajectory and the rotor-powered flight trajectory to the candidate landing site, the estimated energy consumption of the remaining rotor battery life during the rotor-powered flight trajectory and the time needed for the UAV to land at the candidate landing site exceed the energy and time constraints. And in response to determining that the estimated energy consumption of the remaining rotor battery life during the rotor-powered flight trajectory and the time needed for the UAV to land at the candidate landing site exceed the energy and time constraints, determining whether, based on a second, different set of parameters for the glide descent trajectory and the rotor-powered flight trajectory to the candidate landing site, the estimated energy consumption of the remaining rotor battery life during the rotor-powered flight trajectory and the time needed for the UAV to land at the candidate landing site exceed the energy and time constraints. Phrased another way, if one set of parameters does not help meet the energy and time constraints, the controller 114 can evaluate a different set of parameters that define a different glide trajectory and/or rotor-powered flight trajectory.

The parameters for the glide descent trajectory and the subsequent rotor-powered flight trajectory to the candidate landing site can take various forms. Within examples, the parameters include a path, as well as a speed profile associated with that path, for reaching the candidate landing site. In particular, the parameters can include a path and speed profile for the glide descent trajectory, the rotor-powered flight trajectory, or a combination of the two. The parameters dictate the glide descent trajectory and the rotor-powered flight trajectory. As such, the controller 114 can evaluate various different glide descent trajectories, rotor-powered trajectories, and corresponding parameters for landing at the candidate landing site to determine whether one or more of those approaches will meet the energy and time constraints.

With respect to the glide descent trajectory, other example parameters that the controller 114 can evaluate include (i) an indicated airspeed of the UAV 102 (e.g., an airspeed commanded by a flight operator, automatically selected as a conservative minimum speed, or optimized via hodograph and wind estimates), (ii) a lift over drag ratio (which varies with airspeed), (iii) a roll-angle, or angle of bank of the UAV 102, and (iv) a rate of descent. The rate of descent can be manipulated using flaps or drag devices of the UAV 102 and controlling the roll-angle. Equation 1, for instance, indicates how the rate of descent, RoD, can be approximated as a function of the indicated airspeed, V_glide, the lift over drag ratio, LoD, and the roll-angle, $\varphi$.

$$RoD \approx \frac{V\_glide}{LoD * \cos(\varphi)} \quad \text{(Equation 1)}$$

Consider, for instance, a scenario in which the propulsion system 110 fails when the UAV 102 is at an altitude of 15,000 feet above ground level (AGL), and the UAV 102 has 25 minutes of remaining avionics battery life and 6 minutes of remaining rotor battery life. The UAV 102 must then land safely within those 25 minutes and without using more than 6 minutes of rotor power. If the UAV 102 was to glide in a straight line from 15,000 feet at a lift over drag ratio of 15, the UAV 102 might be able to fly approximately 37 nautical miles in a no-wind situation. However, if the UAV 102 is commanded to fly at an indicated airspeed of 30 meters per second (m/s), this would require approximately 38 minutes, and thus the UAV 102 would run out of avionics power before this point. As such, an operator would need to consider increasing the indicated airspeed, as well as using flaps and/or spiraling, for a higher rate of descent.

Continuing the scenario above, the operator might elect to fly the UAV 102 directly towards a desired landing zone having multiple candidate landing sites instead of spending descent time in spiraling flight. To accomplish this, the operator sets a higher indicated airspeed of 40 m/s and deploys flaps to lose additional altitude. As such, a rate of descent of approximately 4 m/s is achieved, which would require approximately 19 minutes of flight to sea level, and is thus a valid choice for a landing, given the 25 minutes of remaining avionics battery life. In addition, this allows for up to 6 minutes of rotor-powered flight without exceeding the 25 minutes of remaining avionics battery life.

In any event, the controller 114 can use flight parameters that define a particular glide descent trajectory that result in the UAV 102 arriving at a particular altitude (e.g., 100 AGL) and a particular distance away from the candidate landing site (e.g., 100 meters horizontally from the candidate landing site). Given that glide descent trajectory, the controller 114 evaluates parameters for the rotor-powered flight trajectory that continues flight from that particular altitude and distance. If, as a result of the evaluation and in line with the discussion above, the controller 114 determines that the energy and time constraints are exceeded, the controller 114 then attempts to evaluate parameters for an alternative glide descent trajectory and/or parameters for an alternative rotor-powered flight trajectory, or selects an alternative candidate landing site.

With respect to the rotor-powered flight trajectory, other example parameters that the controller 114 can evaluate include rotor inflow velocity, required thrust (approximately equal to one quarter of the UAV's weight), air density, rotor disk area, vehicle air speed (i.e., speed of the unperturbed airflow), resultant air speed, and unperturbed airflow angle relative to rotor disk (nominally equal to vehicle pitch angle).

An example process for evaluating these and other parameters using the rotor edgewise inflow model stored on the controller 114 will now be described. The controller 114 selects a particular procedure for the rotor-powered flight trajectory to the candidate landing site. This procedure can take various forms, including, for instance, a minimum jerk trajectory that minimizes changes in deceleration, a maximum braking trajectory, or a constant deceleration trajectory (e.g., constant deceleration in horizontal flight to ground speed, followed by a constant vertical descent rate). Given the selected procedure, the controller 114 determines an associated speed profile such that the total time in the glide descent trajectory and the total time in the rotor-powered flight trajectory is less than the remaining time that the remaining avionics battery life will allow.

The controller 114 then models the vertical-lift rotors 112 as momentum generating disks that are flying edgewise. Based on the associated speed profile, the controller 114 determines a resulting edgewise inflow by iteratively solving Equation 2 and Equation 3 for each rotor, where $v_i$ is the rotor inflow velocity, T is the required thrust, $\rho$ is the air density, A is the rotor disk area, $V_{infty}$ is the vehicle air speed, $v_{res}$ is the resultant air speed, and $\alpha$ is the unperturbed airflow angle relative to rotor disk.

$$v_i = \frac{T}{2\rho A V_{res}} \quad \text{(Equation 2)}$$

$$V_{res} = \sqrt{(V_{infty}\cos(\alpha))^2 + (V_{infty}\sin(\alpha) + v_i)^2} \quad \text{(Equation 3)}$$

Increased accuracy can be obtained when down flow is accounted for in vehicle air speed and unperturbed airflow angle at the rear rotors. This adjustment can be obtained from known wind tunnel data or from straightforward estimates based on flow from the front rotors.

Using predetermined rotor and electric motor efficiencies, the controller 114 estimates the total energy required for the rotor-powered flight trajectory approach to the candidate landing site. The required rotor power as a function of time, $P_{req}(t)$, is obtained from the inflow velocity solution and is depicted in Equation 4. The energy used as a function of time, $E(t)$, starting from time $t_0$ is depicted in Equation 5, where $\mu$ is the predetermined combined efficiency of the rotor and electric motor.

$$P_{req}(t) = T \times v_i(t) \quad \text{(Equation 4)}$$

$$E(t) = \int_{t0}^{\tau} \mu \times P_{req}(\tau) d\tau \quad \text{(Equation 5)}$$

The controller 114 then compares the resulting energy from Equation 5 against the determined energy constraint. If the controller 114 determines that the energy and time constraints are met, the controller 114 navigates the UAV 102 in accordance with the evaluated parameters. Whereas, if the energy constraint is not met, the controller 114 can evaluate another set of parameters as described above, such as by reducing the length of the rotor-powered approach procedure or selecting a speed profile that favors higher translation speeds.

Continuing the scenario above even further, the UAV 102 might navigate the glide descent trajectory from 15,000 feet to 200 feet AGL, at which point almost 19 minutes will have passed since the loss of operation of the propulsion system 110 and at which point the UAV 102 will begin decelerating to approximately 20 m/s and will transition to using the vertical-lift rotors 112 at 100 feet AGL. The transition might take within one minute to complete, thus giving the UAV 102 approximately 4 to 5 minutes left of time to safely land.

When the controller 114 has evaluated the parameters (e.g., different sets of parameters) relative to the candidate landing site and determines that the estimated energy consumption and time needed for the UAV 102 to land at the candidate landing site exceed the energy and time constraints, the controller 114 responsively selects an alternative candidate landing site. Within examples, the act of selecting the alternative candidate landing site involves selecting, from the set of predetermined landing sites, a next closest landing site to the candidate landing site, such as landing site 146 shown in FIGS. 2 and 3.

Once an alternative candidate landing site has been selected, the controller 114 then uses the rotor edgewise inflow model to evaluate alternative parameters for a glide descent trajectory and subsequent rotor-powered flight trajectory to the alternative candidate landing site, to determine whether, based on evaluation of the alternative parameters, an estimated energy consumption during the rotor-powered flight trajectory and time needed for the UAV 102 to land at the alternative candidate landing site exceed the energy and time constraints. And, in response to determining that the estimated energy consumption and time needed for the UAV 102 to land at the alternative candidate landing site do not exceed the energy and time constraints, the controller 114 selects the alternative candidate landing site to be a target landing site at which to land the UAV 102.

Once the alternative candidate landing site has been evaluated and selected as a target landing site for the UAV 102, the controller 114 controls the UAV 102 to navigate the glide descent trajectory and the rotor-powered flight trajectory to the alternative candidate landing site. To facilitate this, the controller 114 is configured to monitor various flight parameters while the UAV 102 is navigating the glide descent trajectory and, in response to detecting that at least one predefined condition has been met relative to one or more of such flight parameters, control the UAV 102 to (i) switch from the glide descent trajectory to the rotor-powered flight trajectory and then (ii) navigate in accordance with the rotor-powered flight trajectory to the target landing site. Within examples, the at least one predefined condition includes a condition that a speed of the UAV 102 has fallen below a predefined threshold speed (e.g., 25 m/s) and/or a condition that an altitude of the UAV 102 has fallen below a predefined threshold altitude (e.g., 200 feet). Within additional examples, the controller 114 is configured to initiate the transition phase 130 and begin slowing down upon detecting that an altitude of the UAV 102 has fallen below a predefined threshold altitude and to then turn on the vertical-lift rotors 112 upon detecting that a speed of the UAV 102 has fallen below a predefined threshold speed. Other conditions and examples are possible as well.

Figure 4:
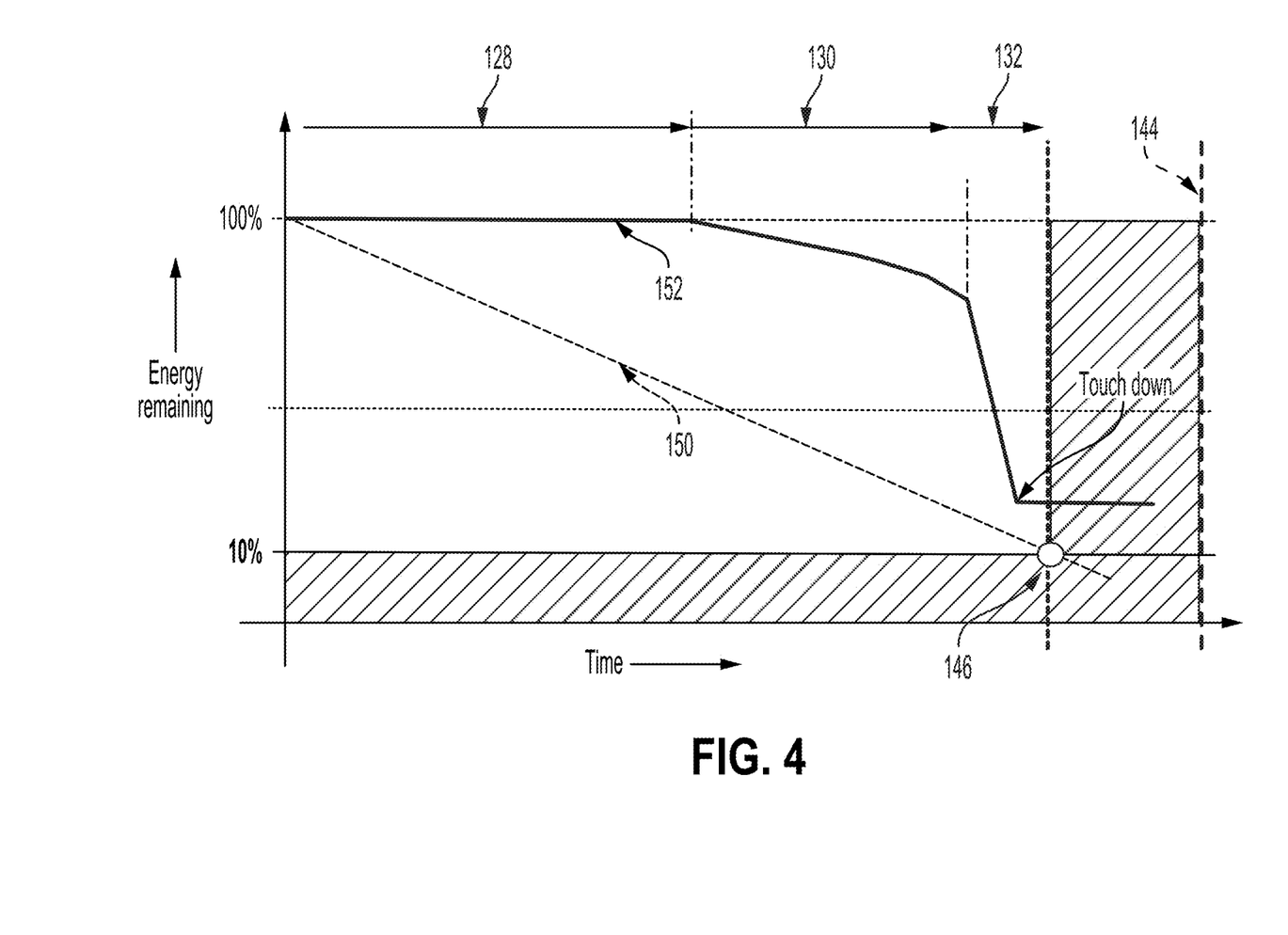
FIG. 4 depicts a graph of remaining avionics battery life and remaining rotor battery life as a function of time during the three phases of a UAV's descent trajectory, according to an example implementation.

FIG. 4 depicts a graph of remaining avionics battery life 150 and remaining rotor battery life 152 as a function of time during the three phases described above, according to an example implementation. In particular, the graph depicts the remaining avionics battery life 150 and the remaining rotor battery life 152 in a scenario where the controller 114 has selected landing site 146 to be an alternative candidate landing site after evaluating landing site 140 and is able to safely land the UAV 102 at landing site 146 with at least 10% left of the battery life of both the avionics system 108 and the vertical-lift rotors 112. As shown, the power draw by the avionics system 108 is constant, whereas the power draw of the vertical-lift rotors 112 does not begin until the transition phase 130.

Furthermore, as noted above, the ground control computing system 106 can perform the disclosed operations for the at least one other UAV 124 that do not comprise a respective controller configured to perform the disclosed operations. As such, the ground control computing system 106 performs the disclosed operations until the ground control computing system 106 determines that respective estimated energy consumption and time needed for the at least one other UAV 124 to land at a particular predetermined landing site of the set of predetermined landing sites do not exceed respective energy and time constraints determined for the at least one other UAV 124. The ground control computing system 106 then transmits, to the at least one other UAV 124 via the communications network 104, data identifying the particular predetermined landing site. In addition, the ground control computing system 106 additionally transmits, to the at least one other UAV 124, the parameters (e.g., direction, speed, etc.) according to which the at least one other UAV 124 should navigate the three phases of descent in order to land at the particular predetermined landing site.

Figure 5:
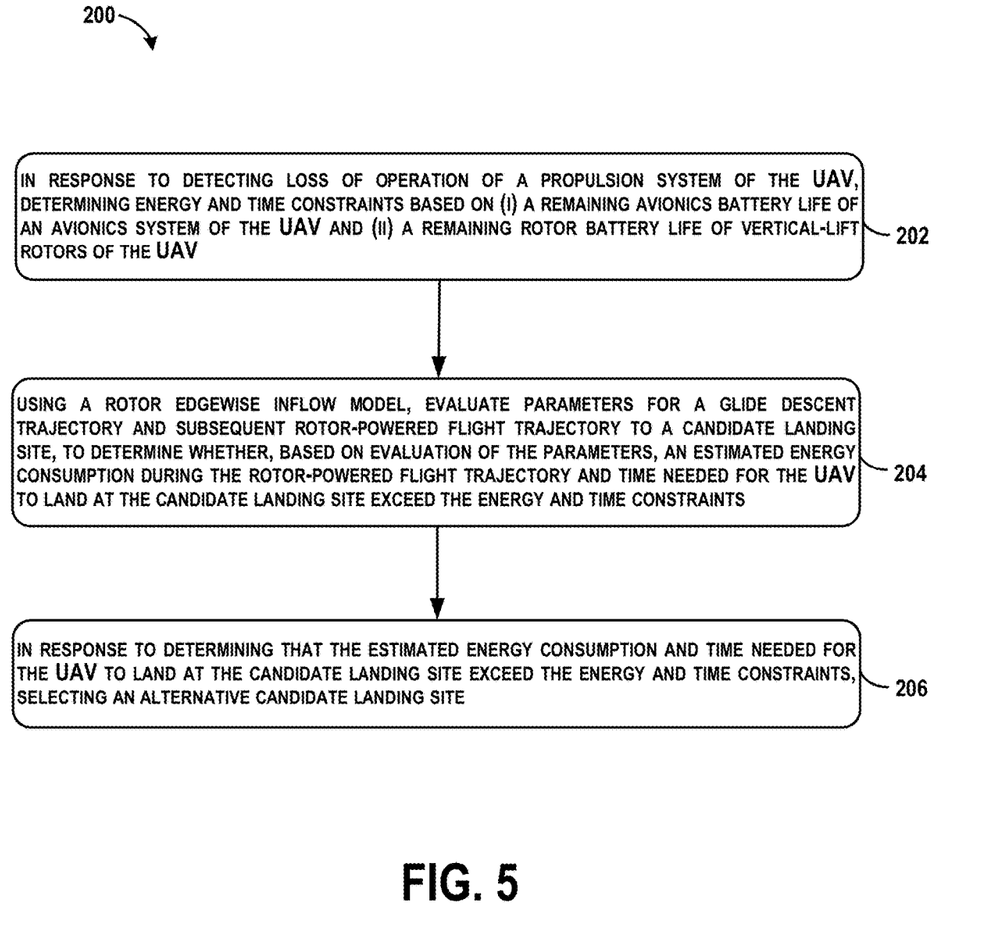
FIG. 5 shows a flowchart of another method, according to an example implementation.

FIG. 5 shows a flowchart of an example of a method 200 for controlling a UAV, such as UAV 102. Method 200 could be used with the system 100 and components thereof shown in FIG. 1 and in the scenarios shown and described with respect to FIGS. 2, 3, and 4. Method 200 may include one or more operations, functions, or actions as illustrated by one or more of blocks 202-206.

At block 202, the method 200 includes, in response to detecting loss of operation of a propulsion system of the UAV, determining energy and time constraints based on (i) a remaining avionics battery life of an avionics system of the UAV and (ii) a remaining rotor battery life of vertical-lift rotors of the UAV.

At block 204, the method 200 includes using a rotor edgewise inflow model, evaluate parameters for a glide descent trajectory and subsequent rotor-powered flight trajectory to a candidate landing site, to determine whether, based on evaluation of the parameters, an estimated energy consumption during the rotor-powered flight trajectory and time needed for the UAV to land at the candidate landing site exceed the energy and time constraints.

At block 206, the method 200 includes in response to determining that the estimated energy consumption and time needed for the UAV to land at the candidate landing site exceed the energy and time constraints, selecting an alternative candidate landing site.

In some embodiments, the evaluating of block 204 includes determining whether, based on a first set of parameters for the glide descent trajectory and the rotor-powered flight trajectory to the candidate landing site, the estimated energy consumption of the remaining rotor battery life during the rotor-powered flight trajectory and the time needed for the UAV to land at the candidate landing site exceed the energy and time constraints. The evaluating of block 204 also includes, in response to determining that the estimated energy consumption of the remaining rotor battery life during the rotor-powered flight trajectory and the time needed for the UAV to land at the candidate landing site exceed the energy and time constraints, determining whether, based on a second, different set of parameters for the glide descent trajectory and the rotor-powered flight trajectory to the candidate landing site, the estimated energy consumption of the remaining rotor battery life during the rotor-powered flight trajectory and the time needed for the UAV to land at the candidate landing site exceed the energy and time constraints.

In some embodiments, the method 200 also includes using the rotor edgewise inflow model to evaluate alternative parameters for a glide descent trajectory and subsequent rotor-powered flight trajectory to the alternative candidate landing site, to determine whether, based on evaluation of the alternative parameters, an estimated energy consumption during the rotor-powered flight trajectory and time needed for the UAV to land at the alternative candidate landing site exceed the energy and time constraints. The method 200 also includes, in response to determining that the estimated energy consumption and time needed for the UAV to land at the alternative candidate landing site do not exceed the energy and time constraints, selecting the alternative candidate landing site to be a target landing site at which to land the UAV. And the method 200 also includes controlling the UAV to navigate the glide descent trajectory and the rotor-powered flight trajectory to the alternative candidate landing site. In such embodiments, the method 200 is performed by a controller onboard the UAV and/or by a ground computing system, located remote from the UAV.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. An unmanned aerial vehicle (UAV) comprising:
   an avionics system;
   a propulsion system;
   vertical-lift rotors; and
   a controller comprising one or more processors configured to execute instructions stored in memory to perform operations comprising:
      in response to detecting loss of operation of the propulsion system, determining energy and time constraints based on (i) a remaining avionics battery life of the avionics system and (ii) a remaining rotor battery life of the vertical-lift rotors;

using a rotor edgewise inflow model stored on the controller, evaluate parameters for a glide descent trajectory and subsequent rotor-powered flight trajectory to a candidate landing site, to determine whether, based on evaluation of the parameters, an estimated energy consumption during the rotor-powered flight trajectory and time needed for the UAV to land at the candidate landing site exceed the energy and time constraints; and in response to determining that the estimated energy consumption and time needed for the UAV to land at the candidate landing site exceed the energy and time constraints, selecting an alternative candidate landing site.

2. The UAV of claim 1, wherein the parameters comprise a path and a speed profile for reaching the candidate landing site.

3. The UAV of claim 1, wherein evaluating the parameters to determine whether, based on evaluation of the parameters, the estimated energy consumption during the rotor-powered flight trajectory and the time needed for the UAV to land at the candidate landing site exceed the energy and time constraints comprises:

determining whether, based on a first set of parameters for the glide descent trajectory and the rotor-powered flight trajectory to the candidate landing site, the estimated energy consumption of the remaining rotor battery life during the rotor-powered flight trajectory and the time needed for the UAV to land at the candidate landing site exceed the energy and time constraints, and in response to determining that the estimated energy consumption of the remaining rotor battery life during the rotor-powered flight trajectory and the time needed for the UAV to land at the candidate landing site exceed the energy and time constraints, determining whether, based on a second, different set of parameters for the glide descent trajectory and the rotor-powered flight trajectory to the candidate landing site, the estimated energy consumption of the remaining rotor battery life during the rotor-powered flight trajectory and the time needed for the UAV to land at the candidate landing site exceed the energy and time constraints.

4. The UAV of claim 1, wherein the operations further comprise:

based at least in part on of the remaining avionics battery life and the remaining rotor battery life of the vertical-lift rotors, determining a maximum range from a current location of the UAV within which the UAV is capable of landing at a landing site.

5. The UAV of claim 4, wherein the operations further comprise:

determining the candidate landing site by selecting, from a set of predetermined landing sites that are within the maximum range of the UAV, a particular predetermined landing site as the candidate landing site for evaluation.

6. The UAV of claim 5, wherein the operations further comprise:

receiving the set of predetermined landing sites via a communications network across which the UAV is configured to engage in communication with a ground control computing system, located remote from the UAV.

7. The UAV of claim 5, wherein selecting the alternative candidate landing site comprises selecting, from the set of predetermined landing sites, a next closest landing site to the candidate landing site.

8. The UAV of claim 1, wherein the operations further comprise:

using the rotor edgewise inflow model to evaluate alternative parameters for a glide descent trajectory and subsequent rotor-powered flight trajectory to the alternative candidate landing site, to determine whether, based on evaluation of the alternative parameters, an estimated energy consumption during the rotor-powered flight trajectory and time needed for the UAV to land at the alternative candidate landing site exceed the energy and time constraints;

in response to determining that the estimated energy consumption and time needed for the UAV to land at the alternative candidate landing site do not exceed the energy and time constraints, selecting the alternative candidate landing site to be a target landing site at which to land the UAV; and controlling the UAV to navigate the glide descent trajectory and the rotor-powered flight trajectory to the alternative candidate landing site.

9. The UAV of claim 8, wherein the operations further comprise:

in response to detecting that at least one predefined condition has been met, controlling the UAV to:
switch from the glide descent trajectory to the rotor-powered flight trajectory, and
navigate in accordance with the rotor-powered flight trajectory to the target landing site.

10. The UAV of claim 9, wherein the at least one predefined condition comprises one or more of a condition that a speed of the UAV has fallen below a predefined threshold speed or a condition that an altitude of the UAV has fallen below a predefined threshold altitude.

11. The UAV of claim 8, wherein the glide descent trajectory comprises UAV operation using the avionics system, but without using the propulsion system and the vertical-lift rotors, and wherein the rotor-powered flight trajectory comprises UAV operation using the vertical-lift rotors and the avionics system, but without using the propulsion system.

12. The UAV of claim 1, wherein the avionics system and the vertical-lift rotors are powered by respective different batteries.

13. A system for controlling one or more unmanned aerial vehicles (UAVs), the system comprising:

the one or more UAVs, each comprising:
an avionics system;
a propulsion system;
vertical-lift rotors; and
a controller comprising one or more processors configured to execute instructions stored in memory to perform operations comprising:
in response to detecting loss of operation of the propulsion system, determining energy and time constraints based on (i) a remaining avionics battery life of the avionics system and (ii) a remaining rotor battery life of the vertical-lift rotors;
using a rotor edgewise inflow model stored on the controller, evaluate parameters for a glide descent trajectory and subsequent rotor-powered flight trajectory to a candidate landing site, to determine whether, based on evaluation of the parameters, an estimated energy consumption during the rotor-powered flight trajectory and time needed for the UAV to land at the candidate landing site exceed the energy and time constraints; and in response to determining that the estimated energy consumption and time needed for the UAV to land at the candidate landing site exceed the energy and time constraints, selecting an alternative candidate landing site; and a communications network configured to communicate, to the one or more UAVs, a set of predetermined landing sites comprising the candidate landing site and the alternative candidate landing site.

14. The system of claim 13, further comprising:
a ground control computing system configured to transmit the set of predetermined landing sites to the one or more UAVs via the communications network.

15. The system of claim 14, wherein the ground control computing system is further configured to:
perform the operations for at least one other UAV, different from the one or more UAVs, that do not comprise a respective controller configured to perform the operations, wherein performing the operations for the at least one other UAV comprises performing the operations until the ground control computing system determines that respective estimated energy consumption and time needed for the at least one other UAV to land at a particular predetermined landing site of the set of predetermined landing sites do not exceed respective energy and time constraints determined for the at least one other UAV, and transmit, to the at least one other UAV via the communications network, data identifying the particular predetermined landing site.

16. A method for controlling an unmanned aerial vehicle (UAV), the method comprising:
in response to detecting loss of operation of a propulsion system of the UAV, determining energy and time constraints based on (i) a remaining avionics battery life of an avionics system of the UAV and (ii) a remaining rotor battery life of vertical-lift rotors of the UAV;

using a rotor edgewise inflow model, evaluate parameters for a glide descent trajectory and subsequent rotor-powered flight trajectory to a candidate landing site, to determine whether, based on evaluation of the parameters, an estimated energy consumption during the rotor-powered flight trajectory and time needed for the UAV to land at the candidate landing site exceed the energy and time constraints; and in response to determining that the estimated energy consumption and time needed for the UAV to land at the candidate landing site exceed the energy and time constraints, selecting an alternative candidate landing site.

17. The method of claim 16, wherein evaluating the parameters to determine whether, based on evaluation of the parameters, the estimated energy consumption during the rotor-powered flight trajectory and the time needed for the UAV to land at the candidate landing site exceed the energy and time constraints comprises:
determining whether, based on a first set of parameters for the glide descent trajectory and the rotor-powered flight trajectory to the candidate landing site, the estimated energy consumption of the remaining rotor battery life during the rotor-powered flight trajectory and the time needed for the UAV to land at the candidate landing site exceed the energy and time constraints, and in response to determining that the estimated energy consumption of the remaining rotor battery life during the rotor-powered flight trajectory and the time needed for the UAV to land at the candidate landing site exceed the energy and time constraints, determining whether, based on a second, different set of parameters for the glide descent trajectory and the rotor-powered flight trajectory to the candidate landing site, the estimated energy consumption of the remaining rotor battery life during the rotor-powered flight trajectory and the time needed for the UAV to land at the candidate landing site exceed the energy and time constraints.

18. The method of claim 16, further comprising:
using the rotor edgewise inflow model to evaluate alternative parameters for a glide descent trajectory and subsequent rotor-powered flight trajectory to the alternative candidate landing site, to determine whether, based on evaluation of the alternative parameters, an estimated energy consumption during the rotor-powered flight trajectory and time needed for the UAV to land at the alternative candidate landing site exceed the energy and time constraints;

in response to determining that the estimated energy consumption and time needed for the UAV to land at the alternative candidate landing site do not exceed the energy and time constraints, selecting the alternative candidate landing site to be a target landing site at which to land the UAV; and controlling the UAV to navigate the glide descent trajectory and the rotor-powered flight trajectory to the alternative candidate landing site.

19. The method of claim 18, wherein the method is performed by a controller onboard the UAV.

20. The method of claim 18, wherein the method is performed by a ground computing system, located remote from the UAV.

* * * * *